(12) United States Patent
Yao et al.

(10) Patent No.: US 12,120,006 B2
(45) Date of Patent: Oct. 15, 2024

(54) TECHNOLOGIES FOR PERFORMANCE DATA STREAMING

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 592 days.

(21) Appl. No.: 17/283,615

(22) PCT Filed: Oct. 22, 2019

(86) PCT No.: PCT/US2019/057375
§ 371 (c)(1),
(2) Date: Apr. 8, 2021

(87) PCT Pub. No.: WO2020/086542
PCT Pub. Date: Apr. 30, 2020

(65) Prior Publication Data
US 2022/0321435 A1    Oct. 6, 2022

Related U.S. Application Data

(60) Provisional application No. 62/749,495, filed on Oct. 23, 2018.

(51) Int. Cl.
*H04L 43/062* (2022.01)
*H04L 43/04* (2022.01)
(Continued)

(52) U.S. Cl.
CPC .......... *H04L 43/062* (2013.01); *H04L 43/04* (2013.01); *H04W 24/08* (2013.01); *H04W 24/10* (2013.01)

(58) Field of Classification Search
CPC ... H04L 41/5009; H04L 43/026; H04L 43/04; H04L 43/062; H04L 65/61; H04L 65/80; H04W 24/08; H04W 24/10
See application file for complete search history.

(56) References Cited

U.S. PATENT DOCUMENTS 8,762,526 B2    6/2014  Baumback et al.
10,057,790 B2 *  8/2018  Mehrgardt ............ H04W 24/06
(Continued)

FOREIGN PATENT DOCUMENTS

| CA | 2506858 C | * | 7/2014 | ............ H04W 24/00 |
| CN | 111064629 A | * | 4/2020 | ........... H04B 17/364 |
| KR | 10-1561420 B1 | | 10/2015 | |

OTHER PUBLICATIONS

PCT Search Report dated Feb. 12, 2020 in connection with PCT Application No. PCT/US2019/057375.
(Continued)

*Primary Examiner* — Matthew C Sams
(74) *Attorney, Agent, or Firm* — Eschweiler & Potashnik, LLC

(57) ABSTRACT

A service device (e.g., a user equipment (UE), a new radio NB (gNB), or other network component or network management component) as a service provider or a service consumer can process or generate performance data streaming in response to a request to create a performance data stream. Information overhead related to the performance data stream can be provided that enables use of the performance data stream in and through data stream units to support performance measurement collection activities.

19 Claims, 5 Drawing Sheets

(51) Int. Cl.
*H04W 24/08* (2009.01)
*H04W 24/10* (2009.01)

(56) References Cited

U.S. PATENT DOCUMENTS

| | | | |
|---|---|---|---|
| 10,863,376 B2 * | 12/2020 | Yao | H04W 24/10 |
| 11,729,067 B2 * | 8/2023 | Chou | H04W 36/0055 |
| | | | 370/331 |
| 11,910,231 B2 * | 2/2024 | Hu | H04B 17/364 |
| 2002/0013838 A1 | 1/2002 | Kushida et al. | |
| 2006/0179154 A1 | 8/2006 | Sitaraman et al. | |
| 2009/0030942 A1 * | 1/2009 | Jiang | H04L 65/80 |
| 2011/0161484 A1 * | 6/2011 | Van den Bogaert | H04W 8/04 |
| | | | 709/224 |
| 2017/0104647 A1 * | 4/2017 | Chaiyochlarb | H04L 43/55 |
| 2018/0132117 A1 * | 5/2018 | Senarath | H04L 43/026 |
| 2019/0150017 A1 * | 5/2019 | Yao | H04W 24/10 |
| | | | 370/252 |
| 2019/0253912 A1 * | 8/2019 | Yao | H04W 24/10 |
| 2019/0364450 A1 * | 11/2019 | Yao | G06F 9/4881 |
| 2021/0219162 A1 * | 7/2021 | Yao | H04W 76/32 |
| 2022/0045924 A1 * | 2/2022 | Yao | H04L 43/0858 |
| 2022/0174521 A1 * | 6/2022 | Yao | H04W 24/08 |

OTHER PUBLICATIONS

PCT Written Opinion dated Feb. 12, 2020 in connection with PCT Application No. PCT/US2019/057375.
International Preliminary Report on Patentability dated Apr. 27, 2021 in connection with PCT Application No. PCT/US2019/057375.

* cited by examiner

TECHNOLOGIES FOR PERFORMANCE DATA STREAMING

REFERENCE TO RELATED APPLICATIONS

This application claims the benefit of U.S. Provisional Application No. 62/749,495 filed Oct. 23, 2018, entitled "TECHNOLOGIES FOR PERFORMANCE DATA STREAMING", the contents of which are herein incorporated by reference in their entirety.

FIELD

The present disclosure relates to wireless technology and more specifically to performance data streaming.

BACKGROUND

Mobile communication in the next generation wireless communication system, 5G, or new radio (NR) network is going to provide ubiquitous connectivity and access to information, as well as ability to share data, around the globe. 5G networks and network slicing are expected to be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. One major enhancement for LTE in Rel-13 had been to enable the operation of cellular networks in the unlicensed spectrum, via Licensed-Assisted-Access (LAA). Ever since, exploiting the access of unlicensed spectrum has been considered by 3GPP as one of the promising solutions to cope with the ever increasing growth of wireless data traffic.

DETAILED DESCRIPTION

Figure 1:
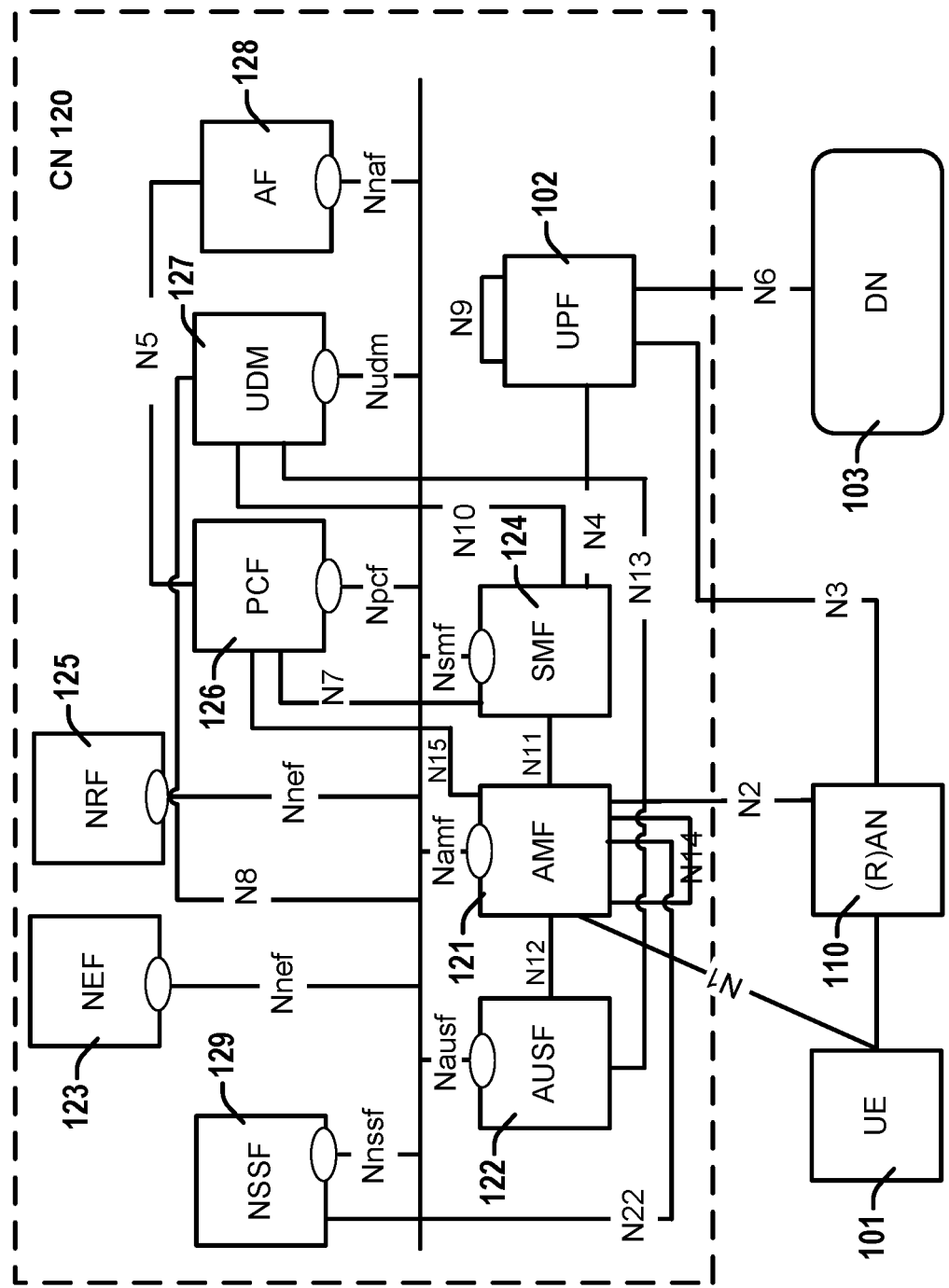
FIG. 1 is a block diagram illustrating another example of network function components (NFs) and interfaces of an NR network architecture that can be employed in accordance with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing circuitry or device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an architecture of a system 100 including a core network (CN) 120 in accordance with various embodiments. The system 100 is shown to include a user equipment (UE) 101, which can be the same or similar to other UEs discussed herein; a radio access network (R)AN 110 or access node (AN); and a data network (DN) 103, which can be, for example, operator services, Internet access or 3rd party services; and a 5GC 110. The 5GC 110 can include an Authentication Server Function (AUSF) 112; an Access and Mobility Function (AMF) 121; a Session Management Function (SMF) 124; a Network Exposure Function (NEF) 123; a Policy Control Function (PCF) 126; a Network Function Repository Function (NRF) 125; a Unified Data Management (UDM) 127; an application function (AF) 128; a user plane function (UPF) 102; and a Network Slice Selection Function (NSSF) 129, each with respective components for processing corresponding 5GC network functions (NFs) or performance measurements related thereto as network functions associated with any one or more of the embodiments herein. Tunnelling or persistent transport connections associated with any embodiments can include a stream, connection such as a logical channel, logical connection, logical channel, or the like, which can be used for measurement task/activities/jobs associated with the NFs, or related measurements, key performance indicators (KPIs), or service-based communications for the network.

The UPF 102 can act as an anchor point for intra-RAT and inter-RAT mobility, an external protocol data unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, uplink (UL)/downlink (DL) rate enforcement), perform Uplink Traffic verification (e.g., Service Data Flow (SDF) to Quality of Service (QoS) flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AMF 121 can be responsible for registration management (e.g., for registering UE 101, etc.), connection management, reachability management, mobility management, and lawful interception of AMF-related events, and access authentication and authorization. The AMF 121 can be a termination point for the N11 reference point between the AMF 121 and the SMF 124. The AMF 121 can provide transport for session management (SM) messages between the UE 101 and the SMF 124, and act as a transparent proxy for routing SM messages. AMF 121 can also provide transport for SMS messages between UE 101 and a Short Message Service (SMS) function (SMSF). AMF 121 can act as Security Anchor Function (SEAF), which can include interaction with the AUSF 122 and the UE 101, receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Security Context Management (SCM) function, which receives a key from the SEAF that it uses to derive access-network specific keys. Furthermore, AMF 121 can be a termination point of a RAN CP interface or RAN connection point interface, which can include or be an N2 reference point between the (R)AN 210 and the AMF 121; and the AMF 121 can be a termination point of Non Access Stratum (NAS) layer (N1) signalling, and perform NAS ciphering and integrity protection.

AMF 121 can also support NAS signalling with a UE 101 over an N3 Interworking Function (IWF) interface. The N3 IWF can be used to provide access to untrusted entities. N3IWF can be a termination point for the N2 interface between the (R)AN 210 and the AMF 121 for the control plane, and can be a termination point for the N3 reference point between the (R)AN 210 and the UPF 102 for the user plane. As such, the AMF 121 can handle N2 signalling from the SMF 124 and the AMF 121 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit a Namf service-based interface, and can be a termination point for an N14 reference point between two AMFs 121 and an N17 reference point between the AMF 121 and a 5G-Equipment Identity Register (EIR) (not shown by FIG. 1).

The UE 101 can register with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

Connection Management (CM) can be used to establish and release a signaling connection between the UE 101 and the AMF 121 over the N1 interface. The signaling connection is used to enable NAS signaling exchange between the UE 101 and the CN 110, and comprises both the signaling connection between the UE and the Access Network (AN) (e.g., Radio Resource Control (RRC) connection or UE-N3IWF connection for non-3GPP access) and the N2 connection for the UE 101 between the AN (e.g., RAN or memory 230) and the AMF 121.

The SMF 124 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 110 request, and released upon UE 101 and 5GC 110 request using NAS SM signaling exchanged over the N1 reference point between the UE 101 and the SMF 124. Upon request from an application server, the 5GC 110 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit a Neff service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code, wherein a job or measurement instance includes a particular task or measurement activity to measure any particular parameter, metric, related to a KPI for any of the NFs. Additionally, the NRF 125 can exhibit the Nnrf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application FE and a Uniform Data Repository (UDR) (the FE and UDR are not shown by FIG. 2). The UDR can store subscription data and policy data for the UDM 127 and the PCF 126, and/or structured data for exposure and application data (including PFDs for application detection, application request information for multiple UEs 101) for the NEF 123.

The NSSF 129 can select a set of network slice instances serving the UE 101. The NSSF 129 can also determine allowed NSSAI and the mapping to the subscribed single Network Slice Selection Assistance Information (S-NSSAIs), if needed. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N12 reference point between AMF 121 and NSSF 129; and can communicate with another NSSF 129 in a visited network via an N31 reference point (not shown by FIG. 2). Additionally, the NSSF 129 can exhibit a Nnssf service-based interface.

Additionally, there can be many more reference points and/or service-based interfaces between the NF services in the NFs; however, these interfaces and reference points have been omitted from FIG. 1 for clarity. In one example, the CN 110 can include a Nx interface, which can be an inter-CN interface between the Mobility Management Entity (MME) and the AMF 121 in order to enable interworking between CN 110 and other CN. Other example interfaces/reference points can include an N5g-Equipment Identity Register (EIR) service-based interface exhibited by a 5G-EIR, an N27 reference point between the Network Repository Function (NRF) in the visited network and the NRF in the home network; and an N31 reference point between the NSSF in the visited network and the NSSF in the home network. Further, any of the above functions, entities, etc. can be considered or include a component as referred to herein.

Figure 2:
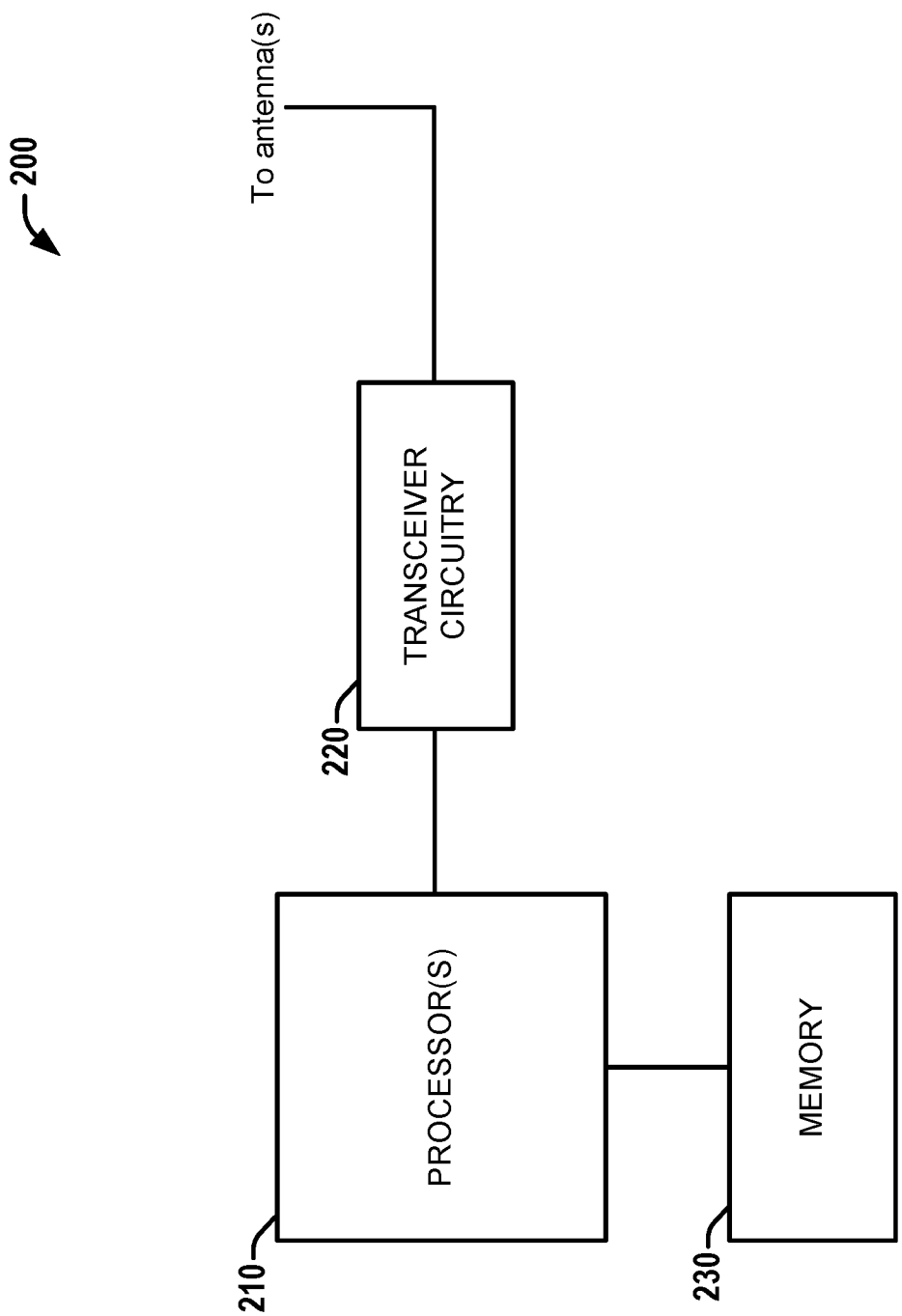
FIG. 2 is a block diagram illustrating a system employable at a UE or gNB, according to various embodiments described herein.

Referring to FIG. 2, illustrated is a block diagram of a system 200 employable at a UE (User Equipment), a next generation Node B (gNodeB or gNB) or other BS (base station)/TRP (Transmit/Receive Point), or a component of a 3GPP (Third Generation Partnership Project) network (e.g., a 5GC (Fifth Generation Core Network)) component such as a UPF (User Plane Function)) that facilitates generation and/or communication of performance measurements associated with one or more of a PDU (Protocol Data Unit) session and/or a N4 session, in embodiments. System 200 can include processor(s) 210 comprising processing circuitry and associated interface(s) (e.g., a communication interface for communicating with communication circuitry 220, a memory interface for communicating with memory 230, etc.), communication circuitry 220 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 230 (which can comprise any of a variety of storage mediums and can store instructions and/or data associated with one or more of processor(s) 210 or the communication circuitry 220 as transceiver circuitry). Specific types of embodiments (e.g., UE embodiments) can be indicated via subscripts (e.g., system 200 comprising processor(s) 210 (e.g., of a UE), communication circuitry 220, and memory 230). In BS embodiments (e.g., system 200 of a gNB) and network component (e.g., UPF (User Plane Function), etc.) embodiments (e.g., system 200 of a UPF) processor(s) 210 of the gNB (etc.), communication circuitry 220 (etc.), and memory 230 (etc.) can be in a single device or can be included in different devices, such as part of a distributed architecture. In embodiments, signaling or messaging between different embodiments of system 200 can be generated by processor(s) 210, transmitted by communication circuitry 220 over a suitable interface or reference point (e.g., N4, etc.), received by communication circuitry 220, and processed by processor(s) 210.

Figure 3:
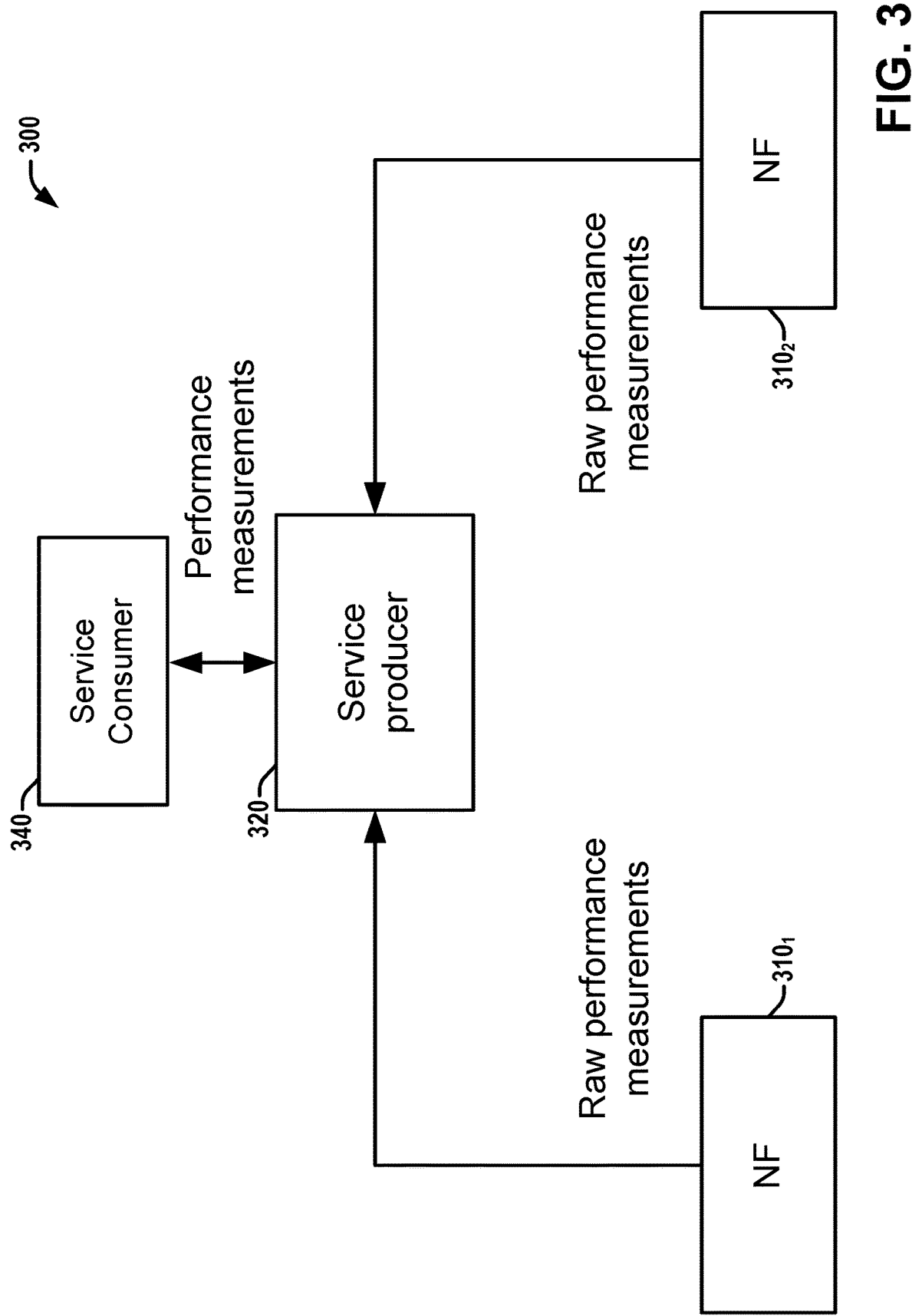
FIG. 3 is another block example of circuitry or service provider/consumer components that can be employed in accordance with various aspects/embodiments described herein.

FIG. 3 illustrates an example performance measurement related service producer/provider in accordance with various details, embodiments or aspects described herein. The service producer 320 collects raw performance measurements from one or more NFs 310 of producer 320, or consumer 340, as described herein and then generates performance measurements for corresponding NFs 310 of producer 320, or consumer 340 for its consumers or a service consumer 340 (e.g., a UE, gNB, or other network device/component). Network Function(s) (NF(s)) $310_i$ can generate raw performance measurements (e.g., related to one or more of PDU session modification, PDU session release, or N4 session establishment). A service producer 320 can collect the raw performance measurements from NF(s) $310_i$, and based on the raw performance measurements, service producer 320 can generate performance measurements (e.g., standard-compliant and/or according to aspects described herein, etc.) for NF(s) $310_i$ for consumer(s) of service producer 320. In some embodiments, service producer 320 can be a separate entity from NF(s) $310_i$, while in other embodiments, a NF $310_i$ can comprise the associated service producer 320, such that the process of generating performance measurements from raw performance measurements occurs within that NF $310_i$. In various embodiments, the NF(s) $310_i$ (and service producer 320) can be any of a variety of NFs $310_i$ (and service producers 320), such as UPF, SMF, etc., which can depend on the nature of the specific performance measurement generated from the specific raw performance measurements. A raw measurement can be a sensed or collected data, where a performance measurement is processed and provided in a set of information with meaning to a receiver. Performance measurements can coincide or be referred to according to 3GPP standard performance measurements such as in TS 23.501, TS 28.550, or TS 28.552 in Release 16 or beyond.

The PM for 5G networks and network slicing is comprised of the management services listed in table 1.

TABLE 1

PM services for 5G networks and network slicing

| Management service name | Management service description |
| --- | --- |
| Measurement job management service for NF | The management service for creating, terminating and querying the measurement job(s) for the NF(s). |
| Performance data reporting service for NF | The management service for reporting the NF performance data. There are two methods of performance data reporting - performance data file reporting and performance data streaming. |
| Measurement job management service for NSSI | The management service for creating, terminating and querying the measurement job(s) for the NSSI(s). |
| Performance data reporting service for NSSI | The management service for reporting the NSSI performance data. There are two methods of performance data reporting - performance data file reporting and performance data streaming. |
| Measurement job management service for NSI | The management service for creating, terminating and querying the measurement job(s) for the NSI(s). |
| Performance data reporting service for NSI | The management service for reporting the NSI performance data. There are two methods of performance data reporting - performance data file reporting and performance data streaming. |
| Measurement job management service for network | The management service for creating, terminating and querying the measurement job(s) for the network(s)/subnetwork(s). The measurement job for the network(s)/subnetwork(s) is to collect the network/subnetwork performance data that are not specific to network slicing. |
| Performance data reporting service for network | The management service for reporting the network/subnetwork performance data that is not specific to network slicing. There are two methods of performance data reporting - performance data file reporting and performance data streaming. |

The use cases and requirements on performance data streaming have been defined in 3GPP TS 28.550. However, various aspects for using these can be expanded in embodiments.

For performance data streaming, the producer 320, uses a frequency by a defining a Granularity Period of collecting the performance data and sends the performance data to one or more consumers. The volume of the performance data reported by performance data streaming can be relatively small, and the granularity period of the performance data stream to be relatively short (e.g., 1 minute, or less). Therefore, the solution of performance data streaming can take the following parameters/criteria into account: the overhead of streams should be controlled to be as small as possible (e.g., second(s), or less than a minute), and the connection between the producer and consumer reliable, as unreliable connections would cause stream delay or losses.

Various embodiments provide for the service producer device 320 to configure performance data streaming, with reduced overhead and reliable connection with the service consumer device. The performance data streaming can be useful for real-time performance measurements, and can be the key data to for performance assurance of 5G networks including network slicing.

In one embodiment, the producer 320 can utilize processing circuitry to control receipt of a request from the consumer 340 to create one or more performance data streams. The performance data stream is a logical channel of communication in which the performance data stream units are sent by the service producer 320 to the consumer 340. The performance data stream is configured to send the performance data stream unit for one or more measurement jobs and one or more measured object instances, for example, as assigned or dedicated thereto. A processor can control sending of a response to the consumer 340 with information of the created stream(s), identifier(s) of unsupported measurement job(s), as well as the status of the result of the performance data stream creation request. Performance data stream units can be sent via the created stream(s) to the consumer 340. The service producer 320 is configured to control receipt of a request to release one or more performance data streams. A release can be discontinuing a persistent transport connection that the performance data stream is based on so that it is no longer accessible or active via the consumer. A response can be sent to the consumer 340 with the status of the result of a stream release request. The release can be in response to a completion of finishing of a measurement/measurement instance of measurement job/activity for a specific measurement job type, for example. After sending the response the producer 320 can stop sending the performance data stream units via the released streams to the consumer 340. The service producer 320 is further configured receive a receipt of a request to suspend one or more performance data streams from the consumer 340, suspend the performance data stream(s), and provide a response to the consumer 340 with the status of the result of the stream suspension request. The provider can stop sending the performance data stream units via the suspended streams to the consumer 340 if the suspension is successfully accepted. The service producer 320 can further receive a request from the consumer 340 to resume one or more performance data streams, resume the performance data streams, provide a response to the consumer 340 with the status of the result of the stream release request, and send the performance data stream units via the resumed streams to the consumer 340.

The information of the created stream(s) contains the identifier(s) of the created performance data stream(s). The information of the created stream(s) further contains the measurement job identifier, measured object instance and measurement types associated to each performance data stream. The performance data stream unit contains the identifier of the stream, a time stamp indicating the end of granularity period during which the measurements are collected, and the measurement result values for the observed measurement types. The measurement result values can have the same number of measurement types and follow the same order as the measurement types communicated via the producer 320 from the consumer 340. When a measurement job is terminated, the service producer 320 automatically releases the performance data stream(s) corresponding to this measurement job. When a measurement job is terminated, the service producer 320 automatically releases the performance data stream(s) corresponding to this measurement job. A request includes the identifier(s) of one or more performance data stream(s). The status of any result can be indicated as success, failure or partial success.

Figure 4:
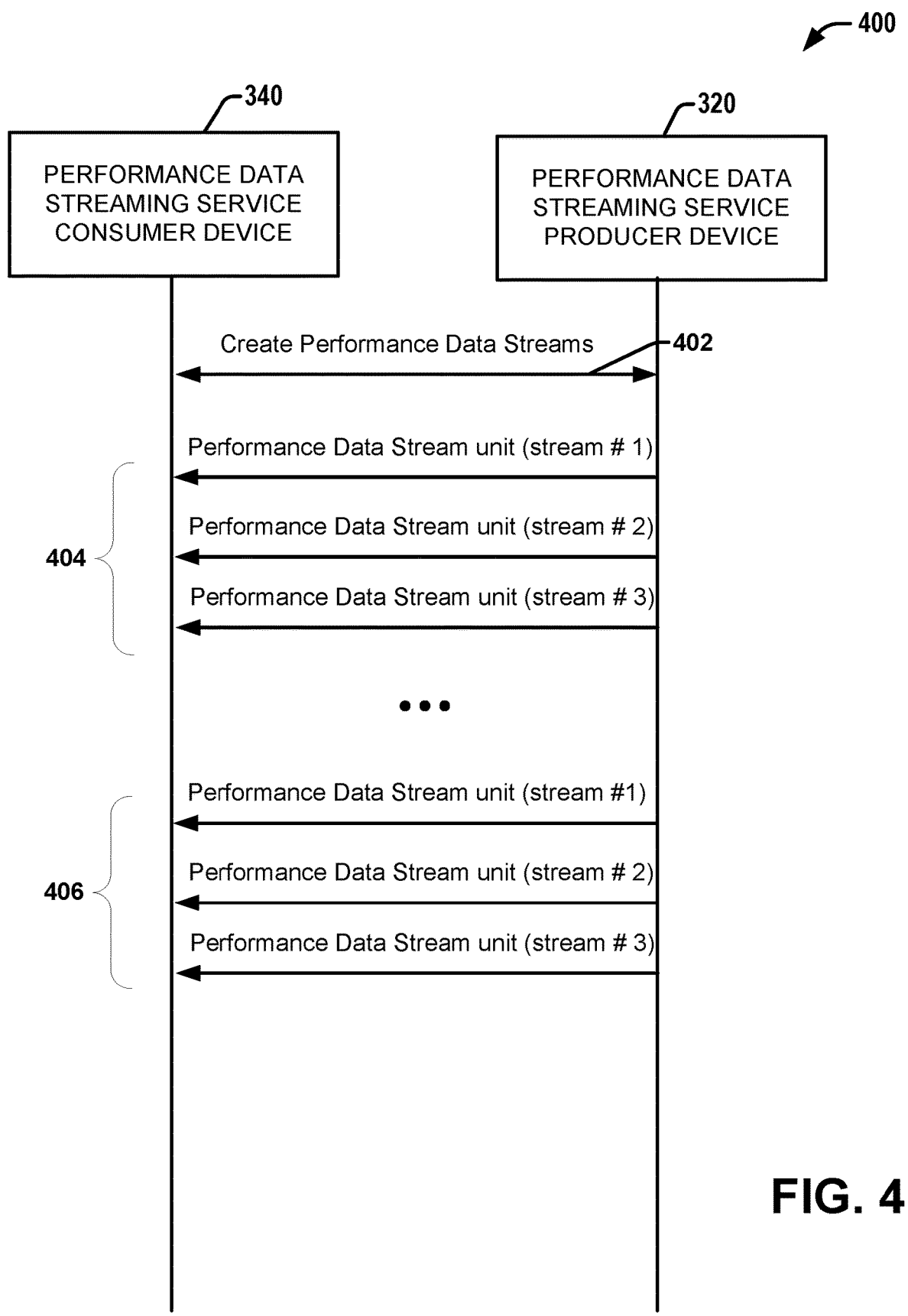
FIG. 4 is another block diagram illustrating a data flow according to various embodiments described herein.

Referring to FIG. 4, illustrated is an example process flow 400 between a service producer device 320 and service consumer device 340 of the NR network. The performance data streaming service consumer 340 creates/establishes one or more persistent streams with the performance data streaming service producer 320. A persistent stream can be a logical channel of communication via which performance data (or performance data stream units) are sent. The term "stream" can be used in the present disclosure, and in some cases, the term "stream" can be synonymous to a logical channel, a logical connection, a logical tunnel, or the like. The performance data stream can be a logical channel of communication in which performance data stream units are sent by the service producer 320 to the service consumer 340. An individual performance data stream (e.g., performance data stream #1, 2, or 3, or a set 404 thereof) can be used to send a performance data stream unit for an individual measurement job and an individual measured object instance, and another performance data stream (e.g., performance data stream #1, 2, or 3, or a set 406 thereof) for another measurement job and an individual measured object instance. The different streams or sets can be independently created by a request in a create performance data stream communication 402, as well as separately and independently sustained according to a specific measurement job/task/activity for collection and maintenance of measured values for the network performance. A performance data stream unit can include an identifier of the stream, a time stamp indicating the end of granularity period during which the measurements are collected by the consumer 340, and measurement result values for the observed measurement types.

The performance data streaming service producer 320, whenever the performance data (stream unit) is ready, sends the performance data stream unit via the corresponding stream to the performance data streaming service consumer 340. Each performance data stream unit contains as little overhead as possible, such as only data pertinent to the particular stream as associated with a particular measurement job only, for example.

The performance data stream is based on a persistent transport connection between the service producer 320 and service consumer 340. That means the performance data stream unit, whenever it is ready, can be sent via the established stream (unless it is released or suspended) without re-setting up the transport connection between the consumer 340 and producer 320 for any additional communication instance or transfer, for example.

In various embodiments, the service producer 320 is configured to receive a request to create one or more performance data streams from the service consumer 340. In some embodiments, the request includes identifier(s) of one or more performance data stream(s). Additionally, or alternatively, the request to create one or more performance data streams is a request or otherwise indicates to create the performance data stream(s) for one or more measurement job(s). In response to receipt of the request, the service producer 320 is configured to create the performance data stream(s) according to the request, and to send a response to the service consumer 340 with information of the created data stream(s). The service produces can be configured to send the performance data stream(s) as performance data stream units via the created stream(s) to the consumer 340.

As a part of these embodiments, the response sent to the service consumer 340 includes information of the created data stream(s), and can also include identifier(s) of unsupported measurement job(s) and/or the status of the result of the performance data stream creation request. The information of the created stream(s) can include identifier(s) of the created performance data stream(s). The information of the created stream(s) can also include a measurement job identifier, a measured object instance, and measurement types associated with each performance data stream. The measurement result values can have the same number of elements and follow the same order as the measurement types. The status of the result can include respective values to indicate success, partial success, or failure.

As a part of these embodiments, the service producer 320 is configured to detect or otherwise determine when a measurement job is terminated. The measurement job can be terminated in response to a request from the service consumer 340, in response to a request from some NF associated with the measurement job, due to system errors/failures, or for any other reason. When a measurement job is terminated, the service producer 320 is configured to automatically release the performance data stream(s) corresponding to the measurement job.

The service producer 320 is configured to receive a request to release one or more of the performance data streams from the service consumer 340. In response, the service producer 320 is configured to release the performance data streams. The service producer 320 is configured to respond to the service consumer 340 with the status of the result of the stream release request, and to stop sending the performance data stream units via the released streams to the consumer 340.

The service producer 320 is configured to suspend the performance data streams in response to receipt of a request to suspend one or more performance data streams. The service producer 320 is configured to respond to the consumer 340 with the status of the result of the stream suspension request, and stop sending the performance data stream units via the suspended streams to the consumer 340.

The service producer 320 is configured to resume the performance data streams in response to receipt of a request to resume one or more performance data streams. The service producer 320 is configured to send a response to the service consumer 340 with a status of the result of the stream release request, and to send the performance data stream units via the resumed streams to the service consumer 340.

Performance Data Streaming Operations and Streaming Unit

The operations and parameters for performance data streaming are discussed below using certain names, however, the operations and parameters could be also named differently from the ones used in the present disclosure. Any one or more parameters can be utilized for measurement jobs at measurement instances for measurement activities/ performance measurement collection activities associated with a performance data stream via performance data units (e.g., packets of the performance data stream, encapsulated data with measurement values, or the like).

Operation createPerformanceDataStreams (M)

The create performance data stream (e.g., 402) operation supports the authorized consumer to request establishing one or more performance data streams with the performance data streaming service producer.

A performance data stream can be the logical channel of communication in which the Performance Data Stream Units (for the content of the Performance Data Stream Unit, based on any embodiments, tables or other description herein) are sent by the producer 320 to the consumer 340.

The consumer 340 can request the producer 320 to establish the performance data streams (streamings) for one or more measurement jobs in one request.

One performance data stream could only support one measurement job for one measured object instance. If there are multiple measurement jobs, created for the same measured object instance, each measurement job can be assigned with a dedicated performance data stream for the measured object instance; and if one measurement job is created for multiple measured object instances, each measured object instance shall be assigned with a dedicated stream for the measurement job. When a measurement job is terminated, the corresponding performance data stream(s) for this measurement job can be released by the performance data streaming service producer 320, and no performance data stream units can be sent via these performance data stream(s) anymore.

The performance data stream (e.g., interface(s) shown between components) can be generated based on a persistent transport connection between the producer and consumer 340. The producer 320 can send the performance data stream unit via the established stream (unless it is released or suspended) to the consumer whenever the performance data stream unit is ready.

| Input parameters for Operation createPerformanceDataStreams | | | |
|---|---|---|---|
| Parameter Name | Quali-fier | Information type | Comment |
| consumerReference | M | The reference of the consumer to which the performance data streams are established. | The format of the reference may have dependency on the solution set. |
| jobIdList | M | List of JobId. | It specifies the list of JobId for which the performance data streams need to be established. An empty list means that the performance data streams need to be established for all of the measurement jobs that are supported by the performance data streaming producer (for the subject consumer). |

| Output parameters for Operation createPerformanceDataStreams | | | |
|---|---|---|---|
| Parameter Name | Quali-fier | Matching Information | Comment |
| StreamInfoList | M | List of < streamId, jobId, measObjDn, measTypes, > | It contains the information of a list of performance data streams successfully established, each stream has following information: streamId: unique identifier of the stream between the producer and the consumer; jobId: the jobId of the measurement job; measObjDn: the DN of the measured object instance; measTypes: a list of measurement type whose measurement result values are to be reported by the Performance Data Stream Units via this stream. The measurement result values shall be reported following the sequence of the measurement types as presented in the 'measTypes' parameter. |
| unsupportedJobIdList | M | List of < jobId, reason > | The parameter of 'unsupportedJobIdList' must be returned if status = PartialSuccess. The reason can be any of: jobId is unknown. jobId is invalid. Insufficient capacity. |
| status | M | ENUM (Success, Failure, PartialSuccess) | An operation may fail because of a specified or unspecified reason. |

| Exceptions for Operation createPerformanceDataStreams | |
|---|---|
| Exception Name | Definition |
| invalidJobId | Condition: one or more jobId in the jobIdList are invalid. Returned Information: Name of the exception; status is set to 'Failure' if all jobIds in the jobIdList are invalid, otherwise the status is set to 'PartialSuccess'. |
| highWorkLoad | Condition: no sufficient capacity Returned Information: Name of the exception and the detailed reason which is one of: CpuBusy; DiskShortage, LowMemory, BandwidthRunOut, otherReason; status is set to 'Failure'. |

Operation releasePerformanceDataStreams (M)

This operation supports the authorized consumer to release the performance data streams with the performance data streaming service producer. Once the performance data stream is released, no Performance Data Stream Unit can be sent via this particular stream or dedicated performance data stream.

Input parameters for Operation releasePerformanceDataStream

| Parameter Name | Qualifier | Information type | Comment |
|---|---|---|---|
| streamIdList | M | List of streamId (See subclause 6.1.a.3) | It specifies the performance data streams to be released. |

Output parameters for Operation releasePerformanceDataStreams

| Parameter Name | Qualifier | Matching Information | Comment |
|---|---|---|---|
| Status | M | ENUM (Success, Failure, PartialSuccess) | An operation may fail because of a specified or unspecified reason. |

Exceptions for Operation releasePerformanceDataStream

| Exception Name | Definition |
|---|---|
| unknownStream | Condition: the one or more streamId is invalid. Returned Information: Name of the exception; status is set to 'Failure' if all streamIds in the streamIdList are invalid, otherwise the status is set to 'PartialSuccess'. |

Operation suspendPerformanceDataStreams (O)

This operation supports the authorized consumer to request suspending the one or more performance data streams.

Once the performance data stream is suspended, the performance data streaming service producer shall not send Performance Data Stream Units via this stream (until is resumed under the consumer's request).

Input parameters for suspendPerformanceDataStream

| Parameter Name | Qualifier | Information type | Comment |
|---|---|---|---|
| streamIdList | M | List of streamId (See subclause 6.1.a.3) | It specifies the performance data streams requested to be suspended. |

Output parameters for suspendPerformanceDataStream

| Parameter Name | Qualifier | Matching Information | Comment |
|---|---|---|---|
| Status | M | ENUM (Success, Failure, PartialSuccess) | An operation may fail because of a specified or unspecified reason. |

Exceptions for suspendPerformanceDataStream

| Exception Name | Definition |
|---|---|
| unknownStream | Condition: the one or more streamId is invalid. Returned Information: Name of the exception; status is set to 'Failure' if all streamIds in the streamIdList are invalid, otherwise the status is set to 'PartialSuccess'. |

Operation Resume PerformanceDataStreams (O)

This operation supports the authorized consumer to request resuming one or more performance data streams. Once the performance data stream is resumed (until it is suspended or released), the performance data streaming service producer can send the Performance Data Stream Unit, whenever it is ready, to the consumers.

Input parameters for resumePerformanceDataStream

| Parameter Name | Qualifier | Information type | Comment |
|---|---|---|---|
| streamIdList | M | List of streamId (See subclause 6.1.a.3) | It specifies the performance data streams requested to be resumed. |

Output parameters for resumePerformanceDataStream

| Parameter Name | Qualifier | Matching Information | Comment |
|---|---|---|---|
| Status | M | ENUM (Success, Failure, PartialSuccess) | An operation may fail because of a specified or unspecified reason. |

Exceptions for resumePerformanceDataStream

| Exception Name | Definition |
|---|---|
| unknownStream | Condition: the one or more streamId is invalid. Returned Information: Name of the exception; status is set to 'Failure' if all streamIds in the streamIdList are invalid, otherwise the status is set to 'PartialSuccess'. |

Performance data streaming services: The components of performance data streaming services for NFs, NSSIs, NSIs and networks/sub-networks are listed in the table below. Components of performance data streaming services: Table below

| Management service | Management service component type A | Management service component type B | Management service component type C |
| --- | --- | --- | --- |
| Performance data streaming service for NFs | createPerformanceDataStreams; releasePerformanceDataStreams; suspendPerformanceDataStreams; resumePerformanceDataStreams | IOCs for 5G NFs, as defined in TS 28.541 [3] | Performance measurements for 5G NFs, as defined in TS 28.552 [2]. |
| Performance data streaming service for NSSIs | createPerformanceDataStreams; releasePerformanceDataStreams; suspendPerformanceDataStreams; resumePerformanceDataStreams | IOC(s) for NSSI, as defined in TS 28.541 [3]. | Performance measurements for NSSI, as defined in TS 28.552 [2]. |
| Performance data streaming service for NSIs | createPerformanceDataStreams; releasePerformanceDataStreams; suspendPerformanceDataStreams; resumePerformanceDataStreams | IOC(s) for NSI, as defined in TS 28.541 [3]. | Performance measurements for NSI, as defined in TS 28.552 [2]. |
| Performance data streaming service for sub-networks | createPerformanceDataStreams; releasePerformanceDataStreams; suspendPerformanceDataStreams; resumePerformanceDataStreams | IOC(s) for sub-network, as defined in TS 28.541 [3]. | Performance measurements for sub-network, as defined in TS 28.552 [2]. |

Performance Data Stream Unit Content Description

Table A.x-1 below lists all the Performance Data Stream Unit content items. It also provides an explanation of the individual items.

TABLE A.x-1

Performance Data Stream Unit content description

| File Content Item | Description |
| --- | --- |
| streamId | The streamId of the performance data stream. |
| granularityPeriodEndTime | Time stamp referring to the end of the granularity period. |
| measResults | This parameter contains the sequence of result values for the observed measurement types.
The "measResults" sequence shall have the same number of elements, which follow the same order as the measurement types presented in "measTypes" in the output parameter of the createPerformanceDataStreams operation (see 6.1.a.3). The NULL value is reserved to indicate that the measurement item is not applicable or could not be retrieved for the object instance. |

Figure 5:
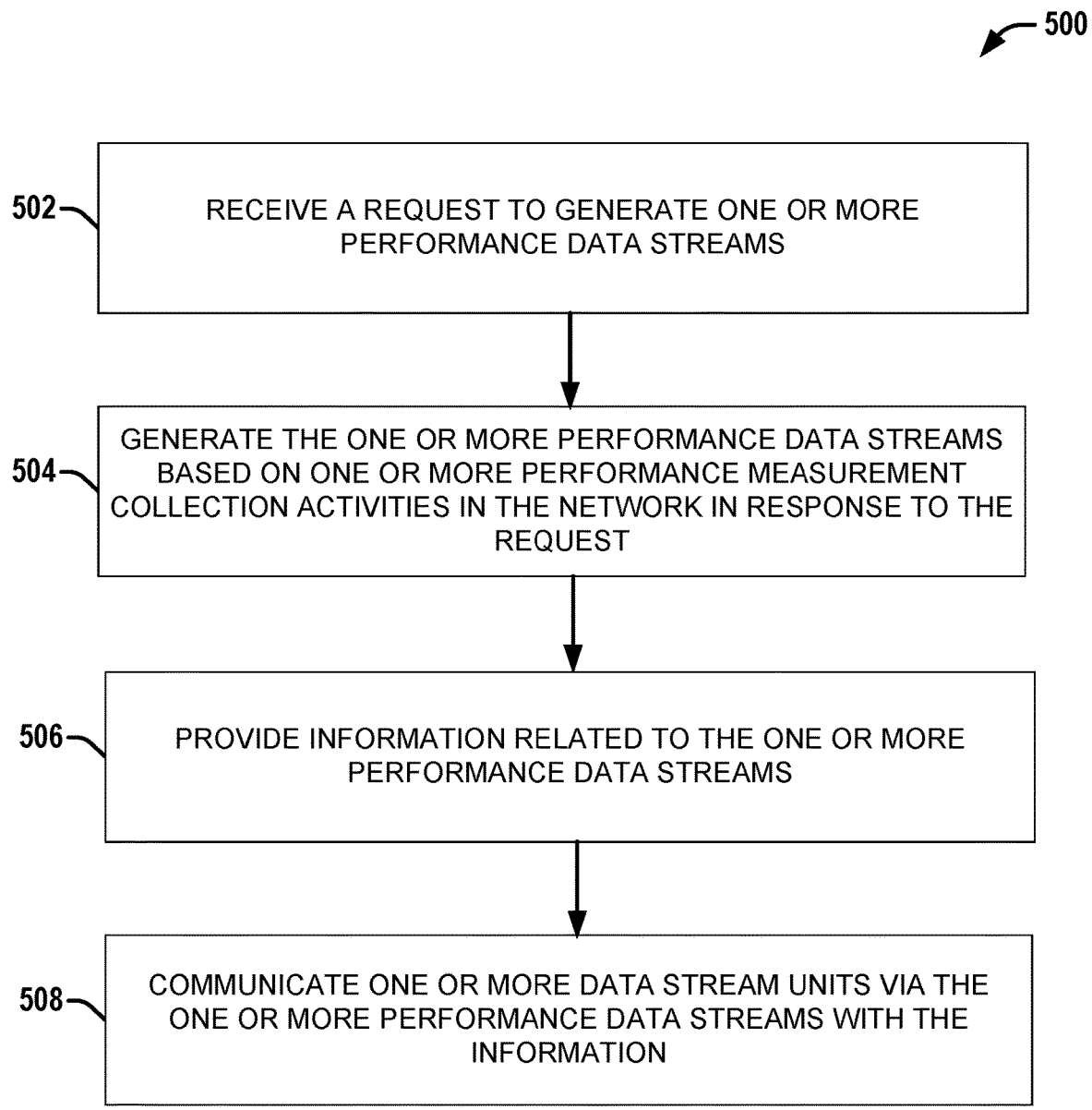
FIG. 5 is a block diagram illustrating an example process flow according to various embodiments described herein.

Referring to FIG. 5, illustrated is an example process flow 500 for a network device (e.g., a user equipment (UE), a new radio NB (gNB), 5GC component/network device or the like) or a service producer/service consumer that can process, generate, or monitor new radio (NR) communication via a 5G network system (5GS) to perform operations involving measurement for reducing power consumption in camped on any cell state.

At 502, the process flow initiates with receiving a request to generate one or more performance data streams.

At 504, the process flow includes generating one or more performance data streams based on one or more performance measurement collection activities in the network in response to the request.

At 506, the process flow includes providing information related to the one or more performance data streams.

At 508, the process flow includes communicating one or more data stream units via the one or more performance data streams with the information.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a service producer device for a new radio (NR) network comprising: one or more processors configured to: receive a request to generate one or more performance data streams; generate the one or more performance data streams based on one or more performance measurement collection activities in the network in response to the request; provide information related to the one or more performance data streams; and communicate one or more data stream units via the one or more performance data streams with the information.

A second example can include the first example, wherein the one or more processors are further configured to: generate a first performance data stream of the one or more performance data streams that corresponds to a first measurement job and a first measured object instance; and generate a second performance data stream of the one or more performance data streams that corresponds to a second measurement job and a second measured object instance.

A third example can include the first or second example, wherein the one or more processors are further configured to release, suspend, or resume the first performance data stream in response to receiving a release request, a suspend request, or a resume request associated with the first performance data stream, while maintaining the second performance data stream as a persistent transport connection to a service consumer device.

A fourth example can include any one of the first through third examples, wherein the one or more processors are further configured to communicate the information by communicating at least one of: a measurement job identifier, a measure object instance, or a measurement type corresponding to a result value reported in a data stream unit assigned to a performance data stream.

A fifth example can include any one of the first through fourth examples, wherein the one or more processors are further configured to generate the one or more data stream units comprising at least one of: an identifier of a performance data stream, a time stamp indication of a granularity period during which a measurement is collected, or a measurement result value for a measurement type.

A sixth example can include any one of the first through fifth examples wherein the measurement result value comprises a same number of measurement types and a same sequence order of the measurement type as communicated by the information of a data stream unit.

A seventh example can include any one of the first through sixth examples, wherein the one or more processors are further configured to communicate a status of at least one of: a release request, a suspend request, or a resume request, associated with a performance data stream of the one or more performance data streams from a service consumer device.

An eighth example can include any one of the first through seventh examples, wherein the status comprises a success, failure or partial success indication to the service consumer device.

A ninth example can include any one of the first through eighth examples, wherein the one or more processors are further configured to, in response to a measurement job being completed or being terminated as received in a notification by a service consumer device associated with the one or more performance data streams, release a performance data stream associated with the measurement job, while maintaining another performance data stream associated with a different measurement job.

A tenth example can be a computer readable storage device storing executable instructions that, in response to execution, cause one or more processors of a service provider device for performance data streaming on a new radio (NR) network to perform operations, the operations comprising: generating performance data streams over the NR network in response to a request for data streaming; generating information related to the performance data streams based on the request; and communicating data stream units comprising the information to enable measurement jobs to be performed via the performance data streams.

An eleventh example can include the tenth example, wherein the operations further comprise generating the performance data streams as logical tunnels or logical channels based on persistent transport connections between RF interface of the service provider device and a service consumer device.

A twelfth example can include the tenth example or the eleventh example, wherein the operations further comprise configuring the performance data streams as dedicated performance data streams according to a different measurement job of a different measured object instance, respectively.

A thirteenth example can include any one of the tenth through twelfth examples, wherein the operations further comprise: assigning different measured object instances to different dedicated performance data streams, respectively, in response to a measurement job being associated with the different measured object instances, and retaining a dedicated performance data stream of the different dedicated performance data streams as a persistent transport connection between the service provider device and a service consumer device according to a status of the measurement job.

A fourteenth example can include any one of the tenth through the thirteenth examples, wherein the operations further comprise: releasing a performance data stream from being utilized in response to a measurement job being terminated or completed by a service consumer device.

A fifteenth example can include any one of the tenth through the fourteenth examples, wherein the operations further comprise: configuring a granularity period of a performance data stream of the performance data streams based on a time threshold that comprises about a minute or less than the minute, wherein the information comprises the granularity period that enables a measurement to be collected by a service consumer device within the granularity period.

A sixteenth example can include any one of the tenth through the fifteenth examples, wherein the operations further comprise: in response to receive a request to resume a suspended performance data stream, resuming activation of a performance data stream of the performance data streams, respond to the request to resume with a status of a stream release request from a service consumer device, and provide data stream units to the service consumer device via the performance data stream that is resuming activation.

A seventeenth example can be an apparatus configured to be employed in a service consumer device for a new radio (NR) network comprising: one or more processors configured to: provide a request to generate a performance data stream; receive one or more data stream units via a performance data stream based on a persistent transport connection over the NR network in response to the request being successful; and determine information from the one or more data stream units that enables a measurement job.

An eighteenth example can include the seventeenth example, wherein the information comprises an identifier of the performance data stream, a time stamp indication of a granularity period during which a measurement of the measurement job is collected, or a measurement result value for a measurement type.

A nineteenth example includes any one of the seventeenth through eighteenth examples, wherein the one or more processors are further configured to: perform the measurement job associated with the performance data stream with a measured object instance, and communicating a measurement result value of the measured object instance via the performance data stream; and in response to the measurement job being associated with multiple object instances, communicating different measurement result values via corresponding performance data streams dedicated to different object instances of a plurality of object instances.

A twentieth example includes any one of the seventeenth through nineteenth examples, wherein the one or more processors are further configured to perform the measure job within a granularity period derived from the one or more data stream units.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other embodiments.

What is claimed is:

1. An apparatus for a wireless communication network, the apparatus comprising:
    one or more processors configured to perform operations comprising:
        receiving a request to generate one or more performance data streams, the request comprising one or more measurement job identifiers;
        sending a response to the request, the response comprising, for each of the one or more performance data streams,
        a stream identifier,
        one of the one or more measurement job identifiers, and
        a list of one or more measurement types;
        generating the one or more performance data streams based on one or more performance measurement collection activities in the wireless communication network in response to the request; and
        communicating one or more data stream units via the one or more performance data streams, each of the one or more data stream units comprising the stream identifier for one of the one or more performance data streams and one or more measurement result values associated with the one of the one or more measurement job identifiers, wherein each of the one or more measurement result values corresponds with one of the one or more measurement types associated with the stream identifier.

2. The apparatus of claim 1, wherein generating the one or more performance data streams comprises:
    generating a first performance data stream of the one or more performance data streams that corresponds to a first measurement job associated with a first one of the one or more measurement job identifiers and a first measured object instance; and
    generating a second performance data stream of the one or more performance data streams that corresponds to a second measurement job associated with a second one of the one or more measurement job identifiers and a second measured object instance.

3. The apparatus of claim 2, wherein the operations further comprise releasing, suspending, or resuming the first performance data stream in response to receiving a release request, a suspend request, or a resume request associated with the first performance data stream, while maintaining the second performance data stream as a persistent transport connection to another apparatus.

4. The apparatus of claim 1, wherein the response further comprises, for each of the one or more performance data streams, a measured object instance.

5. The apparatus of claim 1, wherein each of the one or more data stream units further comprises a time stamp indication of a granularity period during which one or more measurements for the one or more measurement result values are collected.

6. The apparatus of claim 1, wherein:
    the one or more measurement result values comprise a plurality of measurement result values;
    the one or more measurement types comprise a plurality of measurement types; and
    the plurality of measurement result values comprise a same number and a same sequence order of the plurality of measurement types as communicated in the response.

7. The apparatus of claim 1, wherein the operations further comprise communicating a status of at least one of: a release request, a suspend request, or a resume request, associated with a performance data stream of the one or more performance data streams from another apparatus.

8. The apparatus of claim 7, wherein the status comprises a success indication, a failure indication, or a partial success indication to the other apparatus.

9. The apparatus of claim 1, wherein the operations further comprise, in response to a measurement job being completed or being terminated as received in a notification by a service consumer device associated with the one or more performance data streams, releasing a performance data stream associated with the measurement job, while maintaining another performance data stream associated with a different measurement job.

10. A computer readable storage device storing executable instructions that, in response to execution by one or more processors of an apparatus for performance data streaming on a wireless communication network, cause the apparatus to perform operations comprising:
    generating performance data streams over the wireless communication network in response to a request for data streaming, the request comprising one or more measurement job identifiers;
    sending a response to the request, the response comprising a stream identifier for each of the performance data streams, wherein at least one of the performance data streams is associated with each of the one or more measurement job identifiers; and communicating data stream units via the performance data streams, each of the data stream units comprising the stream identifier for one of the performance data streams and one or more measurement result values associated with one of the one or more measurement job identifiers; and in response to receiving, from another apparatus, a request to resume a suspended performance data stream of the performance data streams, resuming activation of the suspended performance data stream, responding to the request to resume with a status of the request to resume, and providing data stream units to the other apparatus via the suspended performance data stream that is resuming activation.

11. The computer readable storage device of claim 10, wherein the operations further comprise generating the performance data streams as logical tunnels or logical channels based on persistent transport connections between a radio frequency (RF) interface of the apparatus and the other apparatus.

12. The computer readable storage device of claim 10, wherein the operations further comprise configuring the performance data streams as dedicated performance data streams, wherein each of the dedicated performance data streams is configured for one measurement job of one measured object instance.

13. The computer readable storage device of claim 10, wherein the operations further comprise:

assigning different measured object instances to different dedicated performance data streams, respectively, in response to a measurement job being associated with the different measured object instances, and retaining a dedicated performance data stream of the different dedicated performance data streams as a persistent transport connection between the apparatus and the other apparatus a according to a status of the measurement job.

14. The computer readable storage device of claim 10, wherein the operations further comprise:

releasing a performance data stream of the performance data streams from being utilized in response to a measurement job being terminated or completed by the other apparatus.

15. The computer readable storage device of claim 10, wherein the operations further comprise:

configuring a granularity period of a performance data stream of the performance data streams based on a time threshold that comprises about a minute or less than the minute, wherein each of the data stream units further comprises a time stamp of the granularity period that enables a measurement to be collected by the other apparatus within the granularity period.

16. An apparatus for a wireless communication network, the apparatus comprising:

one or more processors configured to perform operations comprising:

providing a request to generate a performance data stream, the request comprising a measurement job identifier;

receiving a response to the request, the response comprising a stream identifier for the performance data stream, wherein the performance data stream is associated with the measurement job identifier, and a list of a plurality of measurement types;

receiving one or more data stream units via the performance data stream based on a persistent transport connection over the wireless communication network in response to the request; and determining information from each of the one or more data stream units that is produced for a measurement job associated with the measurement job identifier, the information comprising the stream identifier for the performance data stream and a plurality of measurement result values associated with the measurement job identifier, wherein each of the plurality of measurement result values corresponds with one of the plurality of measurement types associated with the stream identifier.

17. The apparatus of claim 16, wherein the information further comprises a time stamp indication of a granularity period during which a measurement of the measurement job is collected.

18. The apparatus of claim 16, wherein the operations further comprise:

in response to the measurement job being associated with multiple object instances, communicating different measurement result values via corresponding performance data streams dedicated to different object instances of the multiple object instances.

19. The apparatus of claim 16, wherein:

a number and an order of the plurality of measurement result values in the information match a number and an order of the plurality of measurement types.

* * * * *